WILLIAM HOWELL AND N. W. BROWNING, OF WEBSTER CITY, IOWA.

*Letters Patent No. 84,420, dated November 24, 1868.*

IMPROVED COMPOUND FOR HARDENING AND UNITING IRON AND STEEL IN THE MANUFACTURE OF PLOWS, &c.

The Schedule referred to in these Letters Patent and making part of the same.

*To whom it may concern:*

Be it known that we, WILLIAM HOWELL and N. W. BROWNING, of Webster City, in the county of Hamilton, and State of Iowa, have invented a new and valuable Improvement in the Process of Uniting and Hardening Steel and Iron to be Used for Plows and Cultivators; and we do hereby declare that the following is a full, clear, and exact description of our said invention.

The nature of our invention consists in preparing a solution of certain chemical ingredients in which steel and wrought-iron plates are dipped that are to be welded to form plows, the object being to harden said plates, assist in effecting a permanent union between them, and insure their scouring and keeping bright in light or mucky soil.

To accomplish these purposes, we prepare a solution as follows, namely:

We take two ounces of alum, two ounces of saltpetre, two ounces of chloride of sodium, one ounce of borax, two ounces of prussiate of potash, and dissolve them in two gallons of soft water.

After the steel and wrought-iron plates are shaped, and before any attempt is made to weld them together, we dip the steel, well heated, in the solution above described. When this is done, the welding-process is conducted in the ordinary way.

Among the advantages of our device may be reckoned an easy and permanent weld between the plates; but the great object attained is a plow-plate that will scour with great certainty, and keep bright in prairie, alluvial, or other soil, in which there is but little gravel or silica.

Our device is also applicable to the manufacture of hoes and other farming-utensils, the outer surface of which it is desirable to keep bright and clean.

What we claim as our invention, and desire to secure by Letters Patent, is—

The solution herein described, or its equivalent, when used for the purposes specified.

WM. HOWELL.
N. W. BROWNING.

Witnesses:
D. DUMACE,
H. G. DAY.